United States Patent
Tang et al.

(10) Patent No.: US 12,500,288 B2
(45) Date of Patent: Dec. 16, 2025

(54) BATTERY, ELECTRIC APPARATUS, METHOD FOR PREPARING BATTERY, AND APPARATUS FOR PREPARING BATTERY

(71) Applicant: CONTEMPORARY AMPEREX TECHNOLOGY (HONG KONG) LIMITED, Hong Kong (CN)

(72) Inventors: Yu Tang, Ningde (CN); Haiqi Yang, Ningde (CN); Peng Wang, Ningde (CN); Xiaoteng Huang, Ningde (CN)

(73) Assignee: CONTEMPORARY AMPEREX TECHNOLOGY (HONG KONG) LIMITED, Hong Kong (HK)

( * ) Notice: Subject to any disclaimer, the term of this patent is extended or adjusted under 35 U.S.C. 154(b) by 591 days.

(21) Appl. No.: 17/935,937

(22) Filed: Sep. 28, 2022

(65) Prior Publication Data
US 2023/0032539 A1    Feb. 2, 2023

Related U.S. Application Data

(63) Continuation of application No. PCT/CN2021/109918, filed on Jul. 30, 2021.

(51) Int. Cl.
*H01M 10/6556*    (2014.01)
*H01M 10/625*    (2014.01)
(Continued)

(52) U.S. Cl.
CPC ..... *H01M 10/6556* (2015.04); *H01M 10/625* (2015.04); *H01M 10/6554* (2015.04);
(Continued)

(58) Field of Classification Search
None
See application file for complete search history.

(56) References Cited

U.S. PATENT DOCUMENTS

2016/0164148 A1    6/2016    Yum et al.
2019/0393567 A1*   12/2019   Ju .................. H01M 50/211
(Continued)

FOREIGN PATENT DOCUMENTS

CN    209447945 U    9/2019
CN    112117398 A    12/2020
(Continued)

OTHER PUBLICATIONS

The Notice of Preliminary Rejection received in the counterpart KR application 10-2022-7034020, mailed on Feb. 20, 2025, 16 pages with English translation.
(Continued)

*Primary Examiner* — Scott J. Chmielecki
(74) *Attorney, Agent, or Firm* — K&L Gates LLP

(57) ABSTRACT

A battery, an electric apparatus, and a method for preparing battery are provided. In some embodiments, the battery includes at least two layers of battery units arranged in a first direction and a box having an upper cover and a box housing, where the at least two layers of battery units are accommodated in a space formed by the upper cover and the box housing; in the first direction, the at least two layers of battery units include a first battery unit at a top layer and a second battery unit at a bottom layer; and flow channels are formed on the upper cover and the box housing, the flow channel is configured to accommodate fluid, the upper cover is configured to adjust temperature of the first battery unit via the fluid, and the box housing is configured to adjust temperature of the second battery unit via the fluid.

19 Claims, 6 Drawing Sheets

(51) Int. Cl.
  *H01M 10/6554* (2014.01)
  *H01M 10/6555* (2014.01)
  *H01M 10/6557* (2014.01)
  *H01M 50/204* (2021.01)

(52) U.S. Cl.
  CPC ... *H01M 10/6555* (2015.04); *H01M 10/6557* (2015.04); *H01M 50/204* (2021.01); *H01M 2220/20* (2013.01)

(56) References Cited

U.S. PATENT DOCUMENTS

| | | | |
|---|---|---|---|
| 2020/0220240 A1* | 7/2020 | Cheng | H01M 10/6556 |
| 2020/0251698 A1* | 8/2020 | Paramasivam | H01M 10/613 |
| 2020/0365955 A1 | 11/2020 | Kim | |
| 2021/0167344 A1* | 6/2021 | Kwag | H01M 50/35 |
| 2022/0077521 A1 | 3/2022 | Jin et al. | |
| 2025/0112348 A1* | 4/2025 | Hoffmann | H01M 50/636 |
| 2025/0132420 A1* | 4/2025 | Chopard | H01M 10/6554 |
| 2025/0158158 A1* | 5/2025 | Franicevic | H01M 10/643 |

FOREIGN PATENT DOCUMENTS

| | | |
|---|---|---|
| CN | 113036256 A | 6/2021 |
| KR | 20180069989 A | 6/2018 |
| KR | 20190133434 A | 12/2019 |
| KR | 20200041708 A | 4/2020 |
| KR | 1020200133289 A | 11/2020 |
| WO | 2013061869 A1 | 5/2013 |

OTHER PUBLICATIONS

The extended European search report received in the counterpart European Application 21929450.1, mailed on Oct. 2, 2023.
International Search Report received in PCT Application PCT/CN2021/109918 on Apr. 25, 2022.
Written Opinion received in PCT Application PCT/CN2021/109918 on Apr. 25, 2022.
Notice of Reasons for Refusal received in the counterpart Japanese Application 2022-561577, mailed on Jan. 9, 2024.
The Notice of Allowance received in the counterpart KR application 10-2022-7034020, mailed on Sep. 24, 2025, 4 pages with English translation.

* cited by examiner

BATTERY, ELECTRIC APPARATUS, METHOD FOR PREPARING BATTERY, AND APPARATUS FOR PREPARING BATTERY

CROSS-REFERENCE TO RELATED APPLICATIONS

This application is a continuation of International Application No. PCT/CN2021/109918, filed on Jul. 30, 2021, which is hereby incorporated by reference in its entirety.

TECHNICAL FIELD

This application relates to the field of energy storage apparatuses, and more specifically, to a battery, an electric apparatus, a method for preparing battery, and an apparatus for preparing battery.

BACKGROUND

Energy conservation and emission reduction are critical to sustainable development of the automobile industry. Under this situation, due to their advantages in energy conservation and environmental protection, electric vehicles have become an important part for sustainable development of the automobile industry. For electric vehicles, battery technology is an important factor related to their development.

With continuous development of battery technologies, performance requirements for batteries are getting higher, and batteries are expected to be designed in consideration of various factors.

SUMMARY

This application provides a battery, an electric apparatus, a method for preparing battery, and an apparatus for preparing battery, to improve safety of the battery.

According to a first aspect, a battery is provided, including: at least two layers of battery units arranged in a first direction and a box having an upper cover and a box housing, where the at least two layers of battery units are accommodated in a space formed by the upper cover and the box housing; in the first direction, the at least two layers of battery units include a first battery unit located at a top layer and a second battery unit located at a bottom layer; and flow channels are formed on the upper cover and the box housing, the flow channel is configured to accommodate fluid, the upper cover is configured to adjust temperature of the first battery unit via the fluid, and the box housing is configured to adjust temperature of the second battery unit via the fluid.

To improve power supply efficiency of the battery, the battery typically has multiple layers of battery units, and each battery unit has multiple battery cells. In this case, thermal management efficiency of multiple layers of battery cells needs to be improved to keep temperature of each layer of battery units within a given range, so that the battery can deliver excellent electrochemical performance.

In technical solutions of this application, the upper cover and the box housing in the box of the battery each are integrated with a flow channel for thermal management. The upper cover is used to perform thermal management on a battery unit at a top layer, and the box housing is used to perform thermal management on a battery unit at a bottom layer. In this way, a thermal management environment can be formed for the battery by using the upper cover and the box housing, to better perform thermal management on the multiple layers of battery units, thereby improving power supply performance and safety of the battery.

In some embodiments, the battery includes a connecting pipe, where the connecting pipe is configured to connect the flow channel of the upper cover and the flow channel of the box housing, and the connecting pipe communicates with an external flow channel of the box. This allows the fluid in the flow channel of the upper cover and the fluid in the flow channel of the box housing to join and circulate throughout the box, thereby increasing temperature consistency of the multiple layers of battery cells.

In some embodiments, the connecting pipe is provided outside the box. Therefore, sealing the flow channels in the upper cover and the box housing can be performed outside the box, improving the sealing performance and safety. In addition, the connecting pipe outside the box is easy to maintain and replace, making operations more convenient.

In some embodiments, the battery unit includes a battery cell, where the battery cell has an electrode terminal, the electrode terminal is provided on an end surface of the battery cell in a second direction, and the second direction is orthogonal to the first direction. This means that the at least two layers of battery units are arranged in the first direction and electrode terminals of the battery cells in the battery units are arranged towards the second direction. Therefore, in the battery cell, a surface cooled/heated by the upper cover and the box housing is not the end surface provided with the electrode terminal, but a side surface of an battery cell. Such arrangement can enlarge the area of the battery cell subjected to temperature adjustment by the upper cover and the box housing, thereby improving thermal management efficiency.

In some embodiments, at least one of the upper cover and the box housing includes multiple flow sub-channels extending in a third direction; a junction channel extending in the second direction, where the junction channel is located on an end of the flow sub-channel in the third direction to connect the multiple flow sub-channels; and a partition, where the flow sub-channel and the partition are arranged alternately in the second direction, the partition is configured to separate two of the flow sub-channels adjacent to the partition, and the third direction is orthogonal to the first direction and the second direction. Such flow channel and partition structures used in the upper cover and/or the box housing can increase rigidity of the upper cover and/or the box housing and better suppress swelling of the battery cell, thereby increasing overall structural strength of the battery.

In some embodiments, in the upper cover and/or the box housing, thickness of the partition is less than thickness of the flow sub-channel in the first direction. In the case of failure or overheating, the battery cell will swell and deform, with the side surface deformed more seriously. Therefore, a partition with a small thickness is formed on the upper cover and/or the box housing that perform thermal management on the side surface of the battery cell. Compared with adjacent flow sub-channels, the partition with a small thickness has lower rigidity so that such partition is more likely to deform with swelling of the battery cell. In addition, because of the small thickness, there is still room for swelling, thereby ensuring the safety of the battery. Herein, "the upper cover and/or the box housing" refers to an upper cover and/or a box housing with a partition.

In some embodiments, the upper cover and/or the box housing includes a concave-convex plate and a flat plate that are opposite each other, where a concave portion of the concave-convex plate tightly fits with the flat plate to form the partition, and the flow channel is formed between a convex portion of the concave-convex plate and the flat plate. Such concave-convex plate and flat plate are easy to form. In addition, the concave-convex plate and the flat plate are combined to make the upper cover and/or the box housing through a simple process, enabling the partition in the upper cover and/or the box housing to have a smaller thickness than its adjacent flow sub-channels easily.

In some embodiments, the flat plate is closer to the battery unit than the concave-convex plate. Therefore, a surface of the upper cover and/or the box housing facing the battery cell is flat. In this way, height in the first direction can be reduced by using the concave portion of the concave-convex plate to ensure room for swelling, and the thermal management area of the battery cell can be increased by using the flat plate.

In some embodiments, the battery cell has multiple side surfaces, where in the first direction, a side surface adjacent to the upper cover or the box housing is a temperature adjustment surface whose temperature is adjusted via the fluid.

In some embodiments, in the multiple side surfaces of the battery cell, the temperature adjustment surface has a largest area. To be specific, the largest side surface of the battery cell in the first battery unit has its temperature adjusted by the fluid in the upper cover, and the largest side surface of the battery cell in the second battery unit has its temperature adjusted by the fluid in the box housing. Temperature adjustment on the largest side surface can improve the thermal management efficiency.

In some embodiments, in the second direction, the temperature adjustment surface has a central region and lateral regions located on two sides of the central region.

In some embodiments, in the second direction, a length of the central region is ⅛-½ of a length of the temperature adjustment surface, and the central region contains the center of the temperature adjustment surface. The center of the temperature adjustment surface in the second direction is a position at half the length of the temperature adjustment surface in the second direction. When the battery cell deforms, the central region of its temperature adjustment surface seriously deforms.

In some embodiments, in the upper cover and/or the box housing, the partition is provided opposite the central region in the first direction. To be specific, in the upper cover and/or the box housing with the partition, the central region of the temperature adjustment surface overlaps with the partition in a projection in the first direction. A seriously deformed central region in the temperature adjustment surface is opposite a partition with low rigidity, so that the partition is easy to deform with swelling of the central region of the battery cell. In addition, in the first direction, there is room for swelling on at least one side of the partition, so that swelling-induced deformation of the battery cell is not constrained and stress on the upper cover and/or the box housing can be released.

In some embodiments, in the upper cover and/or the box housing, at least one of the flow channels is provided at a position opposite the lateral region in the first direction. In the upper cover and/or the box housing, the flow channel is more rigid than the partition. In the temperature adjustment surface of the battery cell, the lateral region has less swelling-induced deformation. Then, at least one flow channel is provided at a position opposite the lateral region to increase rigidity at a position of the upper cover and/box housing opposite the lateral region and flexibility at a position opposite the central region. This can avoid affecting the thermal management effect due to the decreased effective thermal management area resulting from an increased distance between the upper cover and/or the box housing and the battery cell after the battery cell swells in the first direction.

In some embodiments, the upper cover and/or the box housing has a buffer structure, where in a projection in the first direction, the buffer structure is located outside the temperature adjustment surface, and the buffer structure is configured to provide deformation allowance. Therefore, when the battery cell swells to deform, the buffer structure deforms accordingly, thereby providing room for swelling, without limiting the swelling-induced deformation of the battery cell.

In some embodiments, a thermal management component is formed between any two adjacent layers of battery units, a middle-layer flow channel is formed in the thermal management component, and the middle-layer flow channel is configured to accommodate the fluid to adjust temperature of the two adjacent layers of battery units. To further balance temperature of the battery cell, the upper cover and the box housing each are integrated with a temperature adjustment flow channel, and the thermal management component is further provided between two layers of battery units, so that opposite surfaces of the battery cells in the two layers of battery units can also have temperature adjusted and become interlayer temperature adjustment surfaces.

In some embodiments, the middle-layer flow channel communicates with the flow channel of the upper cover and the flow channel of the box housing. This allows the fluid in the flow channel of the upper cover, fluid in the flow channel of the box housing, and fluid in the middle-layer flow channel to join and circulate throughout the box, thereby increasing temperature consistency of the multiple layers of battery cells.

In some embodiments, the thermal management component is bonded to the two adjacent layers of battery units. The thermal management component and the two adjacent layers of battery units are bonded by using an adhesive with good thermal conductivity, so that the thermal management component can be secured to the battery cell, without reducing the thermal management effect due to displacement of the thermal management component. Therefore, temperature adjustment on the two adjacent layers of battery units can be stably performed through a surface bonded to the battery cell, thereby improving thermal management efficiency.

According to a second aspect, an electric apparatus is provided, including the battery according to the first aspect. The battery is configured to provide electric energy.

According to a third aspect, a method for preparing battery is provided, including: providing battery units, where the battery units are arranged in at least two layers in a first direction; providing a box, where the box has an upper cover and a box housing, flow channels are formed on the upper cover and the box housing, and the flow channel is configured to accommodate fluid; and accommodating the battery units in a space formed by the upper cover and the box housing, where in the first direction, the battery units include a first battery unit located at a top layer and a second battery unit located at a bottom layer, the upper cover is configured to adjust temperature of the first battery unit via the fluid, and the box housing is configured to adjust temperature of the second battery unit via the fluid.

According to a fourth aspect, an apparatus for preparing battery is provided, including a first provision module, configured to provide battery units, where the battery units are arranged in at least two layers in a first direction; a second provision module, configured to provide a box, where the box has an upper cover and a box housing, flow channels are formed on the upper cover and the box housing, and the flow channel is configured to accommodate fluid; and a mounting module, configured to accommodate the battery units in a space formed by the upper cover and the box housing, where in the first direction, the battery units include a first battery unit located at a top layer and a second battery unit located at a bottom layer, the upper cover is configured to adjust temperature of the first battery unit via the fluid, and the box housing is configured to adjust temperature of the second battery unit via the fluid.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

DESCRIPTION OF EMBODIMENTS

Figure 1:
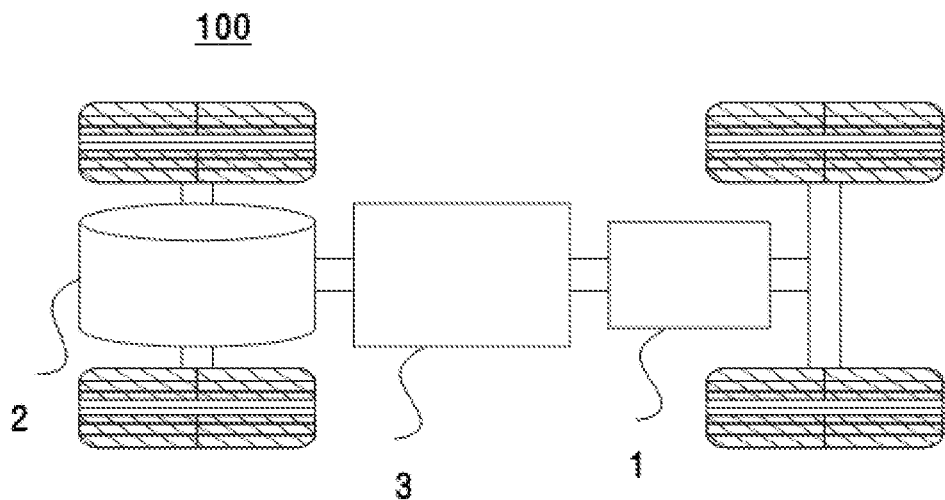
FIG. 1 is a schematic diagram of a vehicle according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", and any variations thereof in the specification and claims of this application and the foregoing description of the drawings are intended to cover non-exclusive inclusions. In the specification, claims, or accompanying drawings of this application, the terms "first", "second", and the like are intended to distinguish between different objects but do not indicate a particular order or a subordinate relationship.

An "embodiment" mentioned in this application means that specified features, structures, or characteristics described with reference to this embodiment may be included in at least one embodiment of this application. The word "embodiment" in various positions in the specification does not necessarily refer to a same embodiment, or an independent or alternative embodiment that is exclusive of other embodiments. A person skilled in the art can clearly and implicitly understand that the embodiments described in this application can be combined with other embodiments.

In the descriptions of this application, it should be noted that unless otherwise specified and defined explicitly, the terms "installment", "link", "connection", and "attachment" should be understood in their general senses. For example, the terms may be a fixed connection, a detachable connection, or an integrated connection, or may be a direct connection, an indirect connection through an intermediate medium, or an internal connection between two elements. A person of ordinary skills in the art can understand specific meanings of these terms in this application based on specific situations.

The term "and/or" in this application describes only an association relationship for describing associated objects and represents that three relationships may exist. For example, A and/or B may represent the following three cases: A alone, both A and B, and B alone. In addition, the character "/" in this application generally indicates an "or" relationship between the associated objects.

In this application, "a plurality of" means two (inclusive) or more. Similarly, "a plurality of groups" means two (inclusive) or more groups, and "a plurality of pieces" means two (inclusive) or more pieces.

The battery mentioned in the embodiments of this application is a single physical module that includes multiple battery cells for providing higher voltage and capacity. For example, the battery mentioned in this application may include a battery module, a battery pack, or the like.

The battery cell includes an electrode assembly and an electrolyte. The electrode assembly includes a positive electrode plate, a negative electrode plate, and a separator. The battery cell functions mainly relying on migration of metal ions between the positive electrode plate and the negative electrode plate. The positive electrode plate includes a positive electrode current collector and a positive electrode active substance layer. A surface of the positive electrode current collector is coated with the positive electrode active substance layer. A positive electrode current collector not coated with the positive electrode active substance layer bulges out of a positive electrode current collector coated with the positive electrode active substance layer, and the positive electrode current collector not coated with the positive electrode active substance layer is used as a positive tab. A lithium-ion battery is used as an example. A positive electrode current collector may be made of aluminum and a positive electrode active material may be lithium cobaltate, lithium iron phosphate, ternary lithium, lithium manganate, or the like. The negative electrode plate includes a negative electrode current collector and a negative electrode active substance layer. A surface of the negative electrode current collector is coated with the negative electrode active substance layer. A negative electrode current collector not coated with the negative electrode active substance layer bulges out of a negative electrode current collector coated with the negative electrode active substance layer, and the negative electrode current collector not coated with the negative electrode active substance layer is used as a negative tab. The negative electrode current collector may be made of copper, and a negative electrode active substance may be carbon, silicon, or the like. To allow a large current to pass through without any fusing, multiple positive tabs are provided and stacked together, and multiple negative tabs are provided and stacked together. The separator may be made of PP, PE, or the like. In addition, the electrode assembly may have a winding structure or a laminated structure. The embodiments of this application are not limited thereto.

The development of battery technologies relates to many design factors, for example, performance parameters such as energy density, cycle life, discharge capacity, and charge and discharge rate. Safety of batteries also needs to be considered.

At present, a battery of an electric vehicle often requires tens or even hundreds of battery cells. To improve power supply efficiency of the battery, the battery typically has multiple layers of battery units arranged in one direction, and each battery unit has a battery cell. In this case, thermal management efficiency of multiple layers of battery cells needs to be improved to maintain temperature of each layer of battery units, so as to keep temperature of the battery in a performance comfort zone and prevent thermal runaway caused by overheating.

In view of this, this application provides a battery, including: at least two layers of battery units arranged in a first direction and a box having an upper cover and a box housing, where the at least two layers of battery units are accommodated in a space formed by the upper cover and the box housing; in the first direction, the at least two layers of battery units include a first battery unit located at a top layer and a second battery unit located at a bottom layer; and flow channels are formed on the upper cover and the box housing, the flow channel is configured to accommodate fluid, the upper cover is configured to adjust temperature of the first battery unit via the fluid, and the box housing is configured to adjust temperature of the second battery unit via the fluid.

The upper cover and the box housing in the box each are integrated with a thermal management flow channel, so that the upper cover can be used to perform thermal management on a battery unit at a top layer, and the box housing can be used to perform thermal management on a battery unit at a bottom layer. In this way, a thermal management environment can be formed for the battery by using the upper cover and the box housing, to better perform thermal management on the multiple layers of battery units, thereby improving power supply performance and safety of the battery.

An embodiment of this application provides an electric apparatus, and a battery is configured to provide electric energy.

The technical solutions described in the embodiments of this application are applicable to various apparatuses that use batteries, such as mobile phones, portable devices, notebook computers, electric bicycles, electric toys, electric tools, electric vehicles, ships, and spacecrafts. For example, spacecrafts include airplanes, rockets, space shuttles, and spaceships.

It should be understood that the technical solutions described in the embodiments of this application are not only applicable to the apparatuses described above, but also applicable to all apparatuses using batteries. However, for brevity of description, in the following embodiments, the vehicle is used as an example for description.

For example, FIG. 1 is a schematic structural diagram of a vehicle 100 according to an embodiment of this application. The vehicle 100 may be a fuel vehicle, a gas vehicle, or a new energy vehicle, and the new energy vehicle may be a battery electric vehicle, a hybrid electric vehicle, an extended range electric vehicle, or the like. A motor 2, a controller 3, and a battery 1 may be disposed inside the vehicle 100, and the controller 3 is configured to control the battery 1 to supply power to the motor 2. For example, the battery 1 may be disposed at the bottom, the front, or the rear of the vehicle 100. The battery 1 may be configured to supply power to the vehicle 100. For example, the battery 1 may be used as an operational power supply for the vehicle 100, and may be applied to a circuit system of the vehicle 100, for example, may be configured to supply power to meet the start, navigation, and driving requirements of the vehicle 100. In another embodiment of this application, the battery 1 not only can be used as the operational power supply for the vehicle 100, but also can be used as a driving power supply for the vehicle 100, to totally or partially replace fossil fuel or natural gas to provide driving power for the vehicle 100.

Figure 2:
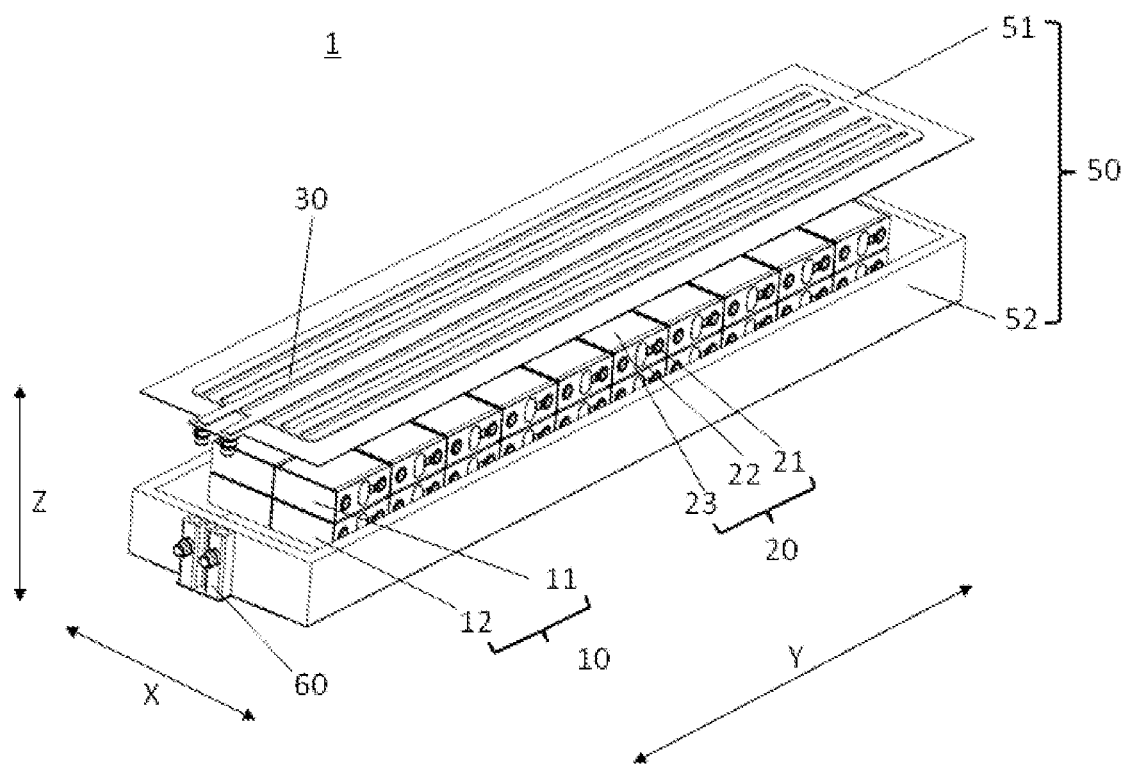
FIG. 2 is a three-dimensional structural diagram of a battery according to an embodiment of this application.

As shown in FIG. 2, to meet different power usage requirements, the battery 1 may include multiple layers of battery units 10 arranged in a first direction Z, where the battery unit 10 has multiple battery cells 20, and the multiple battery cells 20 may be connected in series, in parallel, or in series and parallel, and being connected in series and parallel means a combination of series and parallel connections.

For example, FIG. 2 is a three-dimensional structural diagram of a battery 1 according to an embodiment of this application. The battery 1 includes a box 50, the inside of the box 50 is a hollow structure, and the battery unit 10 is accommodated in the box 50. The battery unit 10 has the battery cell 20. As shown in FIG. 2, the box 50 may include two parts, which are referred to herein as an upper cover 51 and a box housing 52 respectively. The upper cover 51 and the box housing 52 are snap-fitted. Shapes of the upper cover 51 and the box housing 52 may be determined depending on a shape in which the multiple battery cells 20 are combined. For example, the upper cover 51 and the box housing 52 each may be a hollow cuboid and have only one surface with an opening, the opening of the upper cover 51 is disposed opposite the opening of the box housing 52, and the upper cover 51 and the box housing 52 are snap-fitted to form the box 50 with an enclosed chamber. Alternatively, the upper cover 51 is a cuboid with an opening and the box housing 52 is in a plate shape, or the box housing 52 is a cuboid with an opening and the upper cover 51 is in a plate shape, and the upper cover 51 and the box housing 52 are disposed opposite each other and snap-fitted to form the box 50 with an enclosed chamber.

As shown in FIG. 2, the multiple layers of battery units 10 arranged in the first direction Z are accommodated in the box 50, and the multiple battery cells 20 in each battery unit 10 can be arranged in a second direction X and a third direction Y, where the second direction X is orthogonal to the third direction Y, and both the second direction X and the third direction Y are orthogonal to the first direction Z. This means that the multiple battery cells 20 in the battery unit 10 may be arranged in a matrix structure. The multiple battery cells 20 are connected in parallel or in series or in parallel and series, and then placed into the box 50 formed after the upper cover 51 and the box housing 52 are snap-fitted. Optionally, each battery unit 10 may have only one battery cell 20.

As shown in FIG. 2, the battery 1 includes at least two layers of battery units 10 arranged in the first direction Z and the box 50 having the upper cover 51 and the box housing 52, where the at least two layers of battery units 10 are accommodated in a space formed by the upper cover 51 and the box housing 52; in the first direction Z, the at least two layers of battery units 10 include a first battery unit 11 located at a top layer and a second battery unit 12 located at a bottom layer; and flow channels 30 are formed on the upper cover 51 and the box housing 52, the flow channel 30 is configured to accommodate fluid, the upper cover 51 is configured to adjust temperature of the first battery unit 11 via the fluid, and the box housing 52 is configured to adjust temperature of the second battery unit 12 via the fluid.

In FIG. 2, the battery 1 includes two layers of battery units 10. The battery 1 may alternatively have three or more layers of battery units 10.

Under the condition that the battery 1 has multiple layers of battery units 10, thermal management efficiency of the multiple layers of battery units 10 needs to be improved to keep temperature of each layer of battery units 10 within a given range, so that the battery 1 can deliver excellent electrochemical performance. In this application, the upper cover 51 and the box housing 52 in the box 50 each are integrated with a thermal management flow channel, so that the upper cover 51 is used to perform thermal management on a first battery unit 11 at the top layer, and the box housing 52 is used to perform thermal management on a second battery unit 12 at the bottom layer. In this way, a thermal management environment can be formed for the battery 1 by using the upper cover 51 and the box housing 52, to better perform thermal management on the multiple layers of battery units 10, thereby improving power supply performance and safety of the battery 1.

In this application, the upper cover 51 and the box housing 52 that are integrated with a thermal management flow channel have thermal management function, and fluid is accommodated in the upper cover 51 and the box housing 52 to adjust temperature of the battery cell 20. The fluid herein may be liquid or gas. Adjusting temperature means heating or cooling the battery cell 20. In a case of cooling down or lowering the temperature of the battery cell 20, the upper cover 51 and the box housing 52 are configured to accommodate a cooling fluid to lower the temperature of the battery cell 20, the fluid accommodated therein may also be referred to as a cooling medium or cooling fluid, and more specifically, a cooling liquid or cooling gas. In addition, the upper cover 51 and the box housing 52 may also be used for heating to increase the temperature of the battery cell 20, which is not limited in the embodiments of this application.

In some embodiments, the fluid may circulate to achieve a better temperature adjustment effect.

In some embodiments, the fluid may be water, mixed liquid of water and glycol, air, or the like.

As shown in FIG. 2, the battery 1 includes a connecting pipe 60, where the connecting pipe 60 is configured to connect the flow channel 30 of the upper cover 51 and the flow channel 30 of the box housing 52, and the connecting pipe 60 communicates with an external flow channel of the box 50. This allows the fluid in the flow channel 30 of the upper cover 51 and the fluid in the flow channel 30 of the box housing 52 to join and circulate throughout the box 50, thereby increasing temperature consistency of the multiple layers of battery units 10.

In some embodiments, as shown in FIG. 2, the connecting pipe 60 is provided outside the box 50. Therefore, sealing flow channels can be performed outside the box 50, thereby improving the sealing performance and safety. In addition, the connecting pipe 60 outside the box 50 is easy to maintain and replace, making operations more convenient.

In FIG. 2, the first battery unit 11 and the second battery unit 12 each include multiple battery cells 20, and the battery cell 20 has an electrode terminal 21, where the electrode terminal 21 is provided on an end surface 22 of the battery cell 20 in a second direction X. FIG. 2 shows a structure that two electrode terminals 21 are provided on one end surface 22. However, this is not limited. The electrode terminal 21 may also be provided on the other end surface 22 opposite the end surface 22 in the second direction X.

The first battery unit 11 and the second battery unit 12 are arranged in the first direction Z, and the electrode terminals 21 of the battery cells 20 in the first battery unit 11 and the second battery unit 12 are all disposed towards the second direction. Therefore, as shown in FIG. 2, in the battery cell 20, a surface cooled/heated by the upper cover 51 and the box housing 52 is not the end surface 22 provided with the electrode terminal 21 (and the other end surface 22 opposite the end surface 22 in the second direction X), but a side surface of an battery cell 20 other than the two end surfaces 22.

Among the side surfaces of the battery cell 20, the side surface adjacent to the upper cover 51 or the box housing 52 in the first direction Z is a temperature adjustment surface 23 whose temperature is adjusted via the fluid.

In some embodiments, as shown in FIG. 2, the temperature adjustment surface 23 has a largest area among the side surfaces of the battery cell 20. Thus, the temperature adjustment surface 23 of the battery cell 20 in the first battery unit 11 has its temperature adjusted by the upper cover 51, and the temperature adjustment surface 23 of the battery cell 20 in the second battery unit 12 has its temperature adjusted by the box housing 52. Temperature adjustment on the largest side surface can increase the area of the battery cell 20 subjected to thermal management by the upper cover 51 and the box housing 52, thereby improving the thermal management efficiency.

Figure 3:
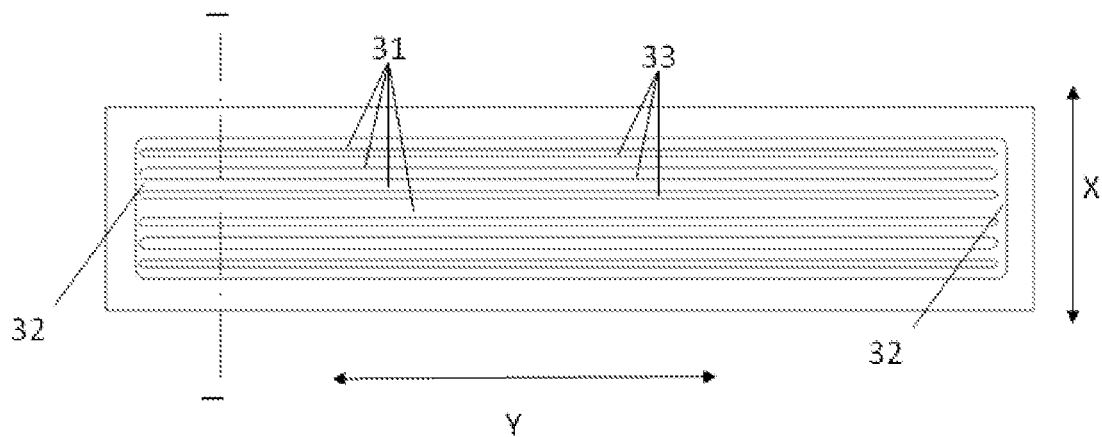
FIG. 3 is a schematic top view showing a structure of a battery.

FIG. 3 is a schematic top view showing a structure of the battery 1. The box housing 52 may also have the same flow channel structure. FIG. 3 shows a state that two battery cells 20 are arranged in the battery unit 10 in the first direction X. This is also applicable to the following figures. However, the battery unit 10 is not limited thereto. The battery unit 10 may have one or more battery cells 20 provided in the first direction X.

Figure 4:
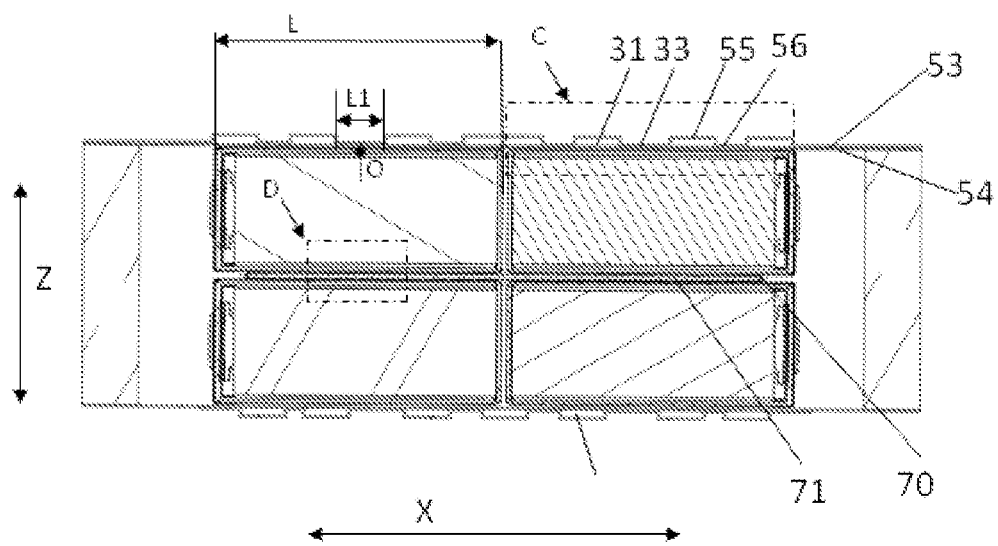
FIG. 4 is a sectional view of part I-I in FIG. 3.

As shown in FIG. 3 and FIG. 4, the upper cover 51 includes multiple flow sub-channels 31 extending in the third direction Y; a junction channel 32 extending in the second direction X, where the junction channel 32 is located on an end of the flow sub-channel 31 in the third direction Y to connect the multiple flow sub-channels 31; and a partition 33, where the flow sub-channel 31 and the partition 33 are arranged alternately in the second direction X, the partition 33 is configured to separate the two flow sub-channels 31 adjacent to the partition 33, and the third direction Y is orthogonal to the first direction Z and the second direction X. The flow channel 30 of the upper cover 51 is composed of the flow sub-channel 31 and the junction channel 32. Such structures of the flow channel 30 of the upper cover 51 and the partition 33 can increase rigidity of the upper cover 51 and better suppress swelling of the battery cell 20, thereby increasing the overall structural strength of the battery 1.

Figure 5:
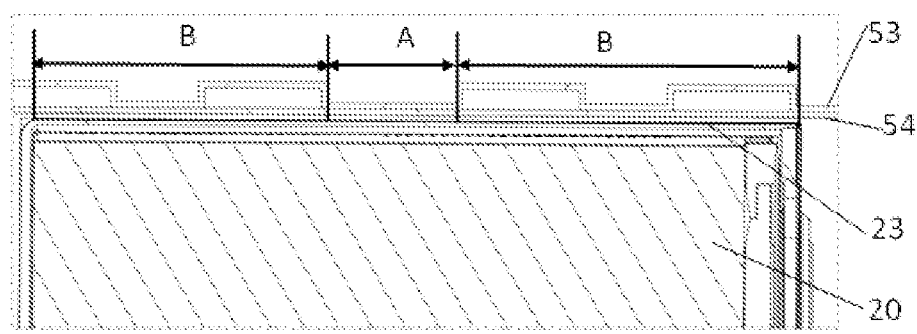
FIG. 5 is an enlarged diagram of part C in FIG. 4.

FIG. 4 is a sectional view of part I-I in FIG. 3. FIG. 5 is an enlarged diagram of part C in FIG. 4. The following describes in detail the structure of the upper cover 51. The box housing 52 may have a same structure as the upper cover 51.

As shown in FIG. 4, in the upper cover 51, thickness of the partition 33 is less than that of any portion other than the partition 33. The partition 33 with a smaller thickness is formed in the upper cover 51, and the partition 33 is less rigid than other portions, so that such partition 33 is more likely to deform with swelling of the battery cell 20. In addition, because of the smaller thickness of the partition 33, there is still room for swelling, without affecting circulation of fluid due to the flow channel 30 being crushed and blocked after the upper cover 51 experiences swelling force.

To implement such function, it is only required that the thickness of the partition 33 be less than the thickness of other portions of the upper cover 51. The structures of the upper cover 51 shown in FIG. 4 and FIG. 5 are examples of such thickness relationship. In FIG. 4 and FIG. 5, the upper cover 51 includes a concave-convex plate 53 and a flat plate 54 that are opposite each other, where a concave portion 56 of the concave-convex plate 53 tightly fits with the flat plate 54 to form the partition 33, and the flow channel 30 of the upper cover 51 is formed between a convex portion 55 of the concave-convex plate 53 and the flat plate 54. Such concave-convex plate 53 and flat plate 54 are easy to form. In addition, the concave-convex plate 53 and the flat plate 54 are combined to make the upper cover 51 through a simple process, and the partition 33 in the upper cover 51 can be easily made thinner than the flow sub-channel 31.

In some embodiments, the flat plate 54 is closer to the battery unit 10 than the concave-convex plate 53, and the surface of the upper cover 51 facing the battery cell 20 is flat, so that the concave portion 56 of the concave-convex plate 53 can be used to reduce the height in the first direction Z and ensure room for swelling, and the flat plate 54 can be used to increase the thermal management area of the battery cell 20.

In the second direction X, the temperature adjustment surface 23 has a central region A and lateral regions B located on two sides of the central region A.

In the second direction X, a length L1 of the central region A is $\frac{1}{8}$-$\frac{1}{2}$ of a length L of the temperature adjustment surface 23, and the central region A contains the center O of the temperature adjustment surface 23. The center O of the temperature adjustment surface 23 is a position at half the length of the temperature adjustment surface 23 in the second direction X. When the battery cell 20 swells to deform, the central region A of its temperature adjustment surface 23 seriously deforms.

In the upper cover 51, the partition 33 is provided opposite the central region A in the first direction Z. This means that the central region A of the temperature adjustment surface 23 overlaps with the partition 33 in a projection in the first direction Z. The seriously deformed central region A in the temperature adjustment surface 23 is opposite the partition 33 with low rigidity, so that the partition 33 is easy to deform with swelling of the central region A of the battery cell 20. In addition, in the first direction Z, there is room for swelling on at least one side of the partition 33, so that swelling-induced deformation of the battery cell 20 is not constrained and stress on the upper cover 51 can be released.

In some embodiments, length of the partition 33 may be greater than or equal to that of the central region A.

In the upper cover 51, at least one flow channel 30 is provided at a position opposite the lateral region B in the first direction Z. The part of the upper cover 51 provided with the flow channel 30 is more rigid than the partition 33. However, in the temperature adjustment surface 23 of the battery cell 20, the lateral region B has less swelling-induced deformation. Then, at least one flow channel 30 is provided at a position opposite the lateral region B increase rigidity at a position of the upper cover 51 opposite the lateral region B and flexibility at a position opposite the central region A. This can avoid affecting the thermal management effect due to the decreased effective thermal management area resulting from an increased distance between the upper cover 51 and the battery cell 20 after the battery cell 20 swells in the first direction Z.

In FIG. 4, the upper cover 51 and the box housing 52 both have the structure with the foregoing characteristics. However, it is only required that at least one of the upper cover 51 and the box housing 52 have such structure.

Figure 6:
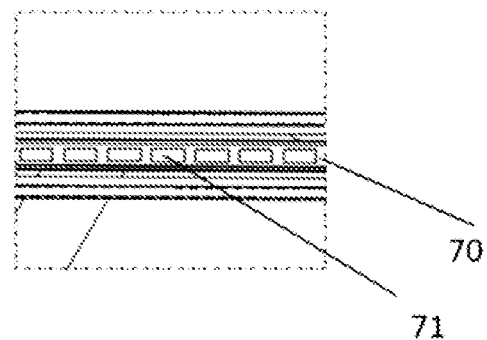
FIG. 6 is an enlarged diagram of part D in FIG. 4.

FIG. 4 also shows a structure that a thermal management component 70 is formed between the adjacent first battery unit 11 and second battery unit 12. FIG. 6 is an enlarged diagram of part D in FIG. 4. A middle-layer flow channel 71 is formed in the thermal management component 70, and the middle-layer flow channel 71 is configured to accommodate fluid to adjust temperature of the adjacent first battery unit 11 and second battery unit 12. In this case, the upper cover 51 and the box housing 52 each are integrated with a flow channel 30 for temperature adjustment, and the thermal management component 70 is also provided between the two adjacent layers of battery units 10, so that opposite surfaces of the battery cells 20 in the two adjacent layers of battery units 10 can have temperature adjusted and become interlayer temperature adjustment surfaces. This can improve the thermal management efficiency and further balance temperature of the battery cell 20.

The middle-layer flow channel 71 can connect the flow channel 30 of the upper cover 51 and the flow channel 30 of the box housing 52, allowing fluid in the flow channel 30 of the upper cover 51, fluid in the flow channel 30 of the box housing 52, and fluid in the middle-layer flow channel 71 to join and circulate throughout the box 50, thereby increasing temperature consistency of the multiple layers of battery units 10.

Two end surfaces of the thermal management component 70 in the first direction Z are bonded to the respective adjacent battery cells 20, and the two end surfaces of the thermal management component 70 may be flat surfaces to increase bonding reliability. The thermal management component 70 is bonded to the battery cells 20 in the adjacent battery units 10 by using an adhesive with good thermal conductivity. Temperature adjustment on the two adjacent layers of battery units 10 can be well performed through the surfaces bonded to the battery cells 20, which, in conjunction with the temperature adjustment by the upper cover 51 and the box housing 52, can greatly improve the thermal management efficiency.

The thermal management component 70 is bonded to the battery cells 20 in the adjacent battery units 10 by using an adhesive with good thermal conductivity, so that the thermal management component 70 can be secured to the battery unit 10, preventing from compromising the thermal management effect due to displacement of the thermal management component 70. Therefore, temperature adjustment on the two adjacent layers of battery units 10 can be stably performed through the surface bonded to the battery cell 20, thereby improving the thermal management efficiency.

FIG. 4 and FIG. 6 show a structure that the battery 1 has two layers of battery units 10 and the thermal management component 70 is provided between the two layers of battery units 10. When the battery 1 has three or more layers of battery units 10, the thermal management component 70 can be provided between any two adjacent layers of battery units 10 in the foregoing manner.

Figure 7:
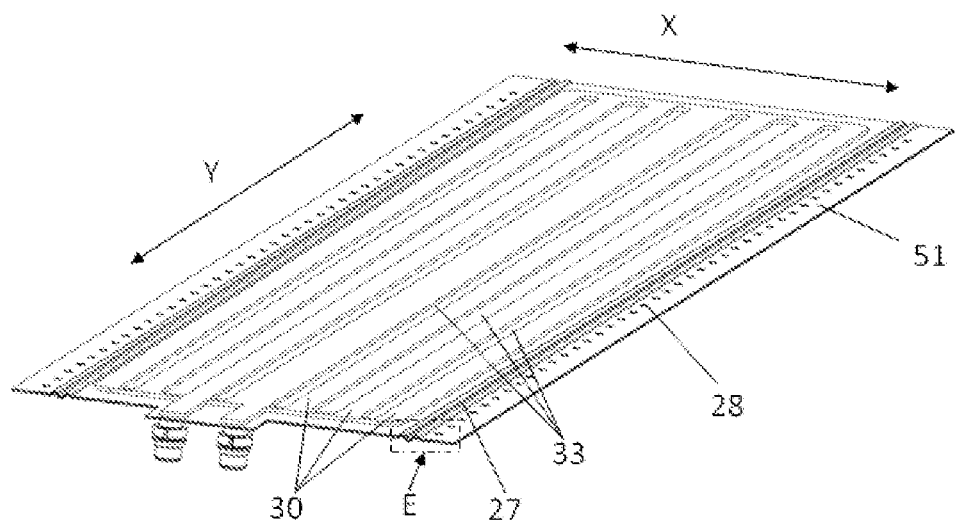
FIG. 7 is a schematic diagram of a buffer structure of an upper cover.
Figure 8:
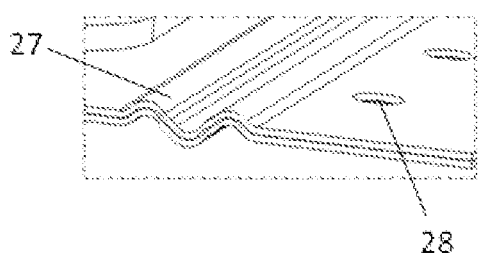
FIG. 8 is an enlarged diagram of part E in FIG. 7.

FIG. 7 is a schematic structural diagram of a buffer structure 27 of the upper cover 51. In a projection in the first direction Z, the buffer structure 27 is located outside the temperature adjustment surface 23, and the buffer structure 27 is configured to provide deformation allowance. FIG. 8 is an enlarged diagram of part E in FIG. 7.

As shown in FIG. 7 and FIG. 8, a mounting hole 28 is formed in the upper cover 51, and the mounting hole 28 is configured to insert a bolt to secure the upper cover 51 and the box housing 52 together. In a projection in the first direction Z, the buffer structure 27 is located outside the temperature adjustment surface 23 and inside the mounting hole 28. In FIG. 7 and FIG. 8, the buffer structure 27 is formed by bending plates forming the upper cover 51, and the buffer structure 27 is wavy. Due to formation of the buffer structure 27 bent in such way, the buffer structure 27 can deform to provide deformation allowance accordingly subsequent when the battery cell 20 swells to deform. As shown in FIG. 7, the buffer structure 27 extends in the third direction Y.

Figure 9:
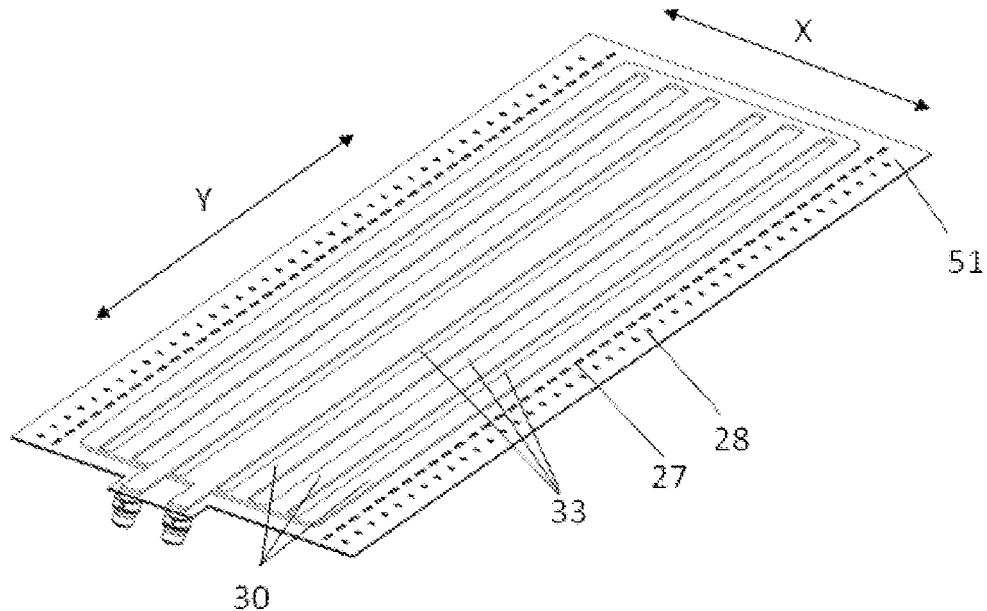
FIG. 9 is a schematic diagram of another embodiment of a buffer structure.
Figure 10:
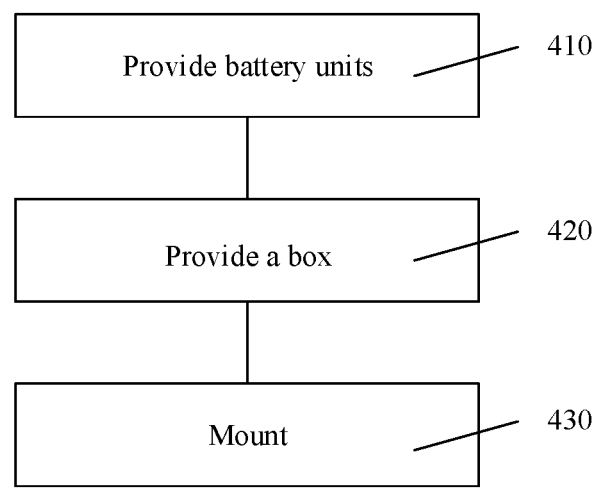
FIG. 10 is a schematic flowchart of a method for preparing battery according to an embodiment of this application.
Figure 11:
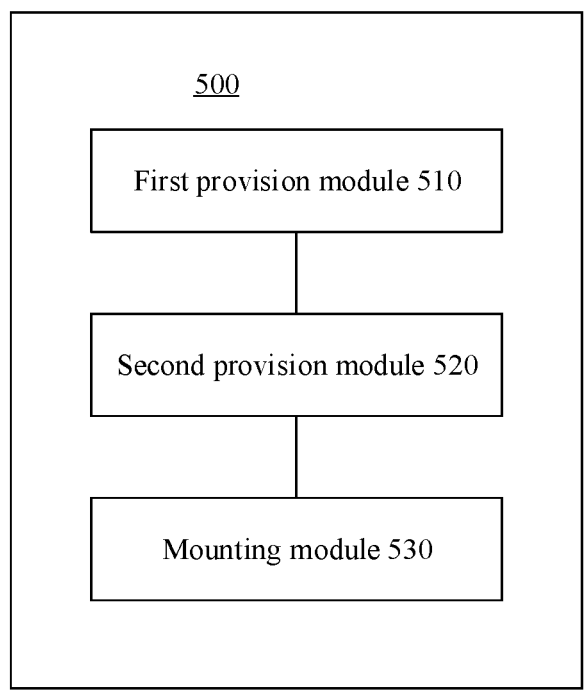
FIG. 11 is a schematic block diagram of an apparatus for preparing battery according to an embodiment of this application.

In some embodiments, as shown in FIG. 9, the buffer structure 27 is formed by removing part of formation material of the upper cover 51. For example, a slot or a hole is formed in the upper cover 51, and part of the formation material is removed to make such part less rigid and easy to deform. As shown in FIG. 9, the buffer structure 27 includes multiple slots or holes formed in the third direction Y. It should be noted that when the buffer structure 27 is a hole, the hole does not run through the whole upper cover 51 to prevent gas generated inside the box from leaking via the hole. For example, when the upper cover 51 is formed by two plates, the hole is formed only in either one of the plates. Shapes of the slot and hole are not limited. For example, in FIG. 9, rectangular slots are formed.

The buffer structure 27 enables the upper cover 51 as a whole to deform in a more adaptive manner when the battery cell 20 swells to deform, thereby improving the overall structural stability and safety of the box 50.

In FIG. 7 and FIG. 9, only the upper cover 51 has the structure with the foregoing characteristics. However, the box housing 52 may also have such structure.

The design of the upper cover 51 has been detailed in the foregoing embodiments. It can be understood that the box housing 52 can also be designed as above.

In this application, the foregoing buffer structure 27 is formed in the upper cover 51 and/or the box housing 52 integrated with the thermal management flow channel. However, the buffer structure 27 can be formed in any component adjacent to the battery cell 20 to provide deformation allowance when the battery cell 20 swells to deform.

An embodiment of this application further provides an electric apparatus, where the electric apparatus may include the battery 1 in the foregoing embodiments. The battery 1 is configured to provide electric energy in the electric apparatus.

The battery and the electric apparatus in the embodiments of this application are described above, and a method and an apparatus for preparing battery in the embodiments of this application are described below. For content that is not described in detail, refer to the foregoing embodiments.

FIG. 7 is a schematic flowchart of a method 400 for preparing battery according to an embodiment of this application. As shown in FIG. 7, the method 400 may include the following steps:

410. Provide battery units 10, where the battery units 10 are arranged in at least two layers in a first direction Z.

420. Provide a box 50, where the box 50 has an upper cover 51 and a box housing 52, flow channels are formed on the upper cover 51 and the box housing 52, and the flow channel is configured to accommodate fluid.

430. Accommodate the battery units 10 in a space formed by the upper cover 51 and the box housing 52, where in the first direction Z, the battery units 10 include a first battery unit 11 located at a top layer and a second battery unit 12 located at a bottom layer, the upper cover 51 is configured to adjust temperature of the first battery unit 11 via the fluid, and the box housing 52 is configured to adjust temperature of the second battery unit 12 via the fluid.

FIG. 8 is a schematic block diagram of an apparatus 500 for preparing battery according to an embodiment of this application. As shown in FIG. 8, the apparatus 500 for preparing battery may include:

a first provision module 510, configured to provide battery units 10, where the battery units 10 are arranged in at least two layers in a first direction Z;

a second provision module 520, configured to provide a box 50, where the box 50 has an upper cover 51 and a box housing 52, flow channels are formed on the upper cover 51 and the box housing 52, and the flow channel is configured to accommodate fluid; and a mounting module 530, configured to accommodate the battery units 10 in a space formed by the upper cover 51 and the box housing 52;

where in the first direction Z, the battery units 10 include a first battery unit 11 located at a top layer and a second battery unit 12 located at a bottom layer; and the upper cover 51 is configured to adjust temperature of the first battery unit 11 via the fluid, and the box housing 52 is configured to adjust temperature of the second battery unit 12 via the fluid.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A battery, comprising:
   at least two layers of battery units arranged in a first direction, and
   a box having an upper cover and a box housing; and, wherein
   the at least two layers of battery units are accommodated in a space formed by the upper cover and the box housing;
   in the first direction, the at least two layers of battery units comprise a first battery unit located at a top layer and a second battery unit located at a bottom layer; and
   flow channels are formed on the upper cover and the box housing, wherein the flow channel is configured to accommodate fluid, the upper cover is configured to adjust temperature of the first battery unit via the fluid, and the box housing is configured to adjust temperature of the second battery unit via the fluid, the battery unit comprises a battery cell, the battery cell has a plurality of side surfaces, in the first direction, a side surface adjacent to the upper cover or the box housing is a temperature adjustment surface whose temperature is adjusted via the fluid, the upper cover has a buffer structure configured to provide deformation allowance, a mounting hole is formed in the upper cover, the mounting hole is configured to insert a bolt to secure the upper cover and the box housing together, in a projection in the first direction, the buffer structure is located outside the temperature adjustment surface and inside the mounting hole.

2. The battery according to claim 1, wherein
the battery comprises a connecting pipe, wherein the connecting pipe is configured to connect the flow channel of the upper cover and the flow channel of the box housing, and the connecting pipe communicates with an external flow channel of the box.

3. The battery according to claim 2, wherein
the connecting pipe is provided outside the box.

4. The battery according to claim 1, wherein
the battery cell has an electrode terminal, the electrode terminal is provided on an end surface of the battery cell in a second direction, and the second direction is orthogonal to the first direction.

5. The battery according to claim 4, wherein
at least one of the upper cover and the box housing comprises multiple flow sub-channels extending in a third direction; a junction channel extending in the second direction, wherein the junction channel is located on an end of the flow sub-channel in the third direction to connect the multiple flow sub-channels; and a partition, wherein the flow sub-channel and the partition are arranged alternately in the second direction, the partition is configured to separate two of the flow sub-channels adjacent to the partition, and the third direction is orthogonal to the first direction and the second direction.

6. The battery according to claim 5, wherein
in the upper cover and/or the box housing, a thickness of the partition is less than thickness of the flow sub-channel in the first direction.

7. The battery according to claim 5, wherein
the upper cover and/or the box housing has a concave-convex plate and a flat plate that are opposite each other, wherein
a concave portion of the concave-convex plate fits with the flat plate to form the partition, and the flow channel is formed between a convex portion of the concave-convex plate and the flat plate.

8. The battery according to claim 7, wherein
the flat plate is closer to the battery unit than the concave-convex plate.

9. The battery according to claim 1, wherein
in the plurality of side surfaces of the battery cell, the temperature adjustment surface has a largest area.

10. The battery according to claim 5, wherein
in the second direction, the temperature adjustment surface has a central region and lateral regions located on two sides of the central region.

11. The battery according to claim 10, wherein
in the second direction, a length of the central region is ⅛-½ of a length of the temperature adjustment surface, and the central region contains the center of the temperature adjustment surface.

12. The battery according to claim 10, wherein
in the upper cover and/or the box housing, the partition is provided opposite the central region in the first direction.

13. The battery according to claim 10, wherein
in the upper cover and/or the box housing, at least one of the flow channels is provided at a position opposite the lateral region in the first direction.

14. The battery according to claim 1, wherein
a thermal management component is formed between any two adjacent layers of battery units, a middle-layer flow channel is formed in the thermal management component, and the middle-layer flow channel is configured to accommodate the fluid to adjust temperature of the two adjacent layers of battery units.

15. The battery according to claim 14, wherein
the middle-layer flow channel communicates with the flow channel of the upper cover and the flow channel of the box housing.

16. The battery according to claim 14, wherein
the thermal management component is bonded to the two adjacent layers of battery units.

17. An electric apparatus, comprising the battery according to claim 1, wherein the battery is configured to provide electric energy.

18. A method for preparing battery, comprising:
providing battery units, wherein the battery units are arranged in at least two layers in a first direction,
providing a box, wherein the box has an upper cover and a box housing, flow channels are formed on the upper cover and the box housing, and the flow channel is configured to accommodate fluid; and
accommodating the battery units in a space formed by the upper cover and the box housing, wherein in the first direction, the battery units comprise a first battery unit located at a top layer and a second battery unit located at a bottom layer, the upper cover is configured to adjust temperature of the first battery unit via the fluid, and the box housing is configured to adjust temperature of the second battery unit via the fluid;
wherein:
the battery unit comprises a battery cell, the battery cell has a plurality of side surfaces, in the first direction, a side surface adjacent to the upper cover or the box housing is a temperature adjustment surface whose temperature is adjusted via the fluid,
the upper cover has a buffer structure configured to provide deformation allowance, a mounting hole is formed in the upper cover, the mounting hole is configured to insert a bolt to secure the upper cover and the box housing together,
in a projection in the first direction, the buffer structure is located outside the temperature adjustment surface and inside the mounting hole.

19. The battery according to claim 5, wherein
the buffer structure comprises a plurality of holes formed in the third direction, the holes are formed in the upper cover by removing a part of formation material of the upper cover, the holes do not run through the whole upper cover in the first direction to prevent gas generated inside the box from leaking via the holes.

* * * * *